July 29, 1952     O. E. SCHUPP, JR     2,604,817

LIGHT POLARIZING COMPOSITION

Filed Oct. 14, 1948

FIG. I

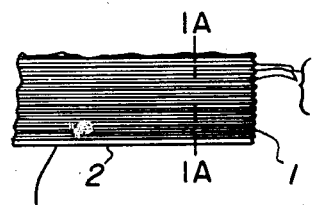

ORIENTED FIBERS OF POLYMERIC MATERIAL HAVING A BIREFRINGENCE OF AT LEAST 0.05

ISOTROPIC MATERIAL HAVING REFRACTIVE INDEX IDENTICAL WITH ONE OF THE REFRACTIVE INDEXES OF THE BIREFRINGENT FIBERS.

FIG. IA.

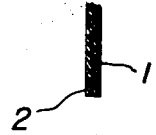

FIG. II.

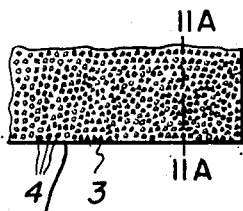

ISOTROPIC PARTICLES HAVING REFRACTIVE INDEX IDENTICAL WITH ONE OF THE REFRACTIVE INDEXES OF THE BIREFRINGENT FILM.

ORIENTED FILM OF POLYMERIC MATERIAL HAVING A BIREFRINGENCE OF AT LEAST 0.05

FIG. IIA.

INVENTOR.
*Orion Edwin Schupp, Jr.*

BY

ATTORNEY

Patented July 29, 1952

2,604,817

UNITED STATES PATENT OFFICE 2,604,817

LIGHT POLARIZING COMPOSITION

Orion Edwin Schupp, Jr., Wilmington, Del., assignor to E. I. du Pont de Nemours & Company, Wilmington, Del., a corporation of Delaware Application October 14, 1948, Serial No. 54,577

3 Claims. (Cl. 88—65)

This invention relates to new polarizing materials having improved properties.

There are various means known in the art for producing polarized light; said means are useful to a limited extent. For one reason or another the hitherto known methods are not entirely satisfactory for use in certain applications, e. g., for use in the production of polarized light for automobile lighting systems. In one common type of polarizing sheet, known as the dichroic type, ordinary light passes into the polarizing sheet where it is resolved into two polarized components which vibrate at right angles to each other. One of these polarized components is transmitted by this sheet and the other is absorbed. Theoretically such a sheet will transmit a maximum of 50% of the light which would be transmitted by a clear glass or plastic sheet of the same refractive index. Actually, a useful dichroic polarizing material absorbs essentially all of the light vibrating in one plane and in addition, some of that vibrating in the other plane so that the actual transmission will always be under the maximum theoretical 50% transmission. Furthermore, many such dichroic polarizing sheets are not as stable to light and heat as desirable. These dichroic polarizing sheets are prepared by suspending dichroic crystals of a colloidal size in a plastic medium. The extrusion of the plastic suspension so orients the needle-like crystals that the sheet obtained behaves optically as a single thin crystal. The most suitable crystals of this type used in dichroic polarizing sheets are composed of herapathite, an iodine derivative of quinine which crystallizes in plates or needles and is highly dichroic. On exposure to light and heat plastic sheets containing such oriented crystals tend to lose their polarizing efficiency because of the instability of herapathite.

Another type of polarizing sheet which has been proposed to overcome some of the disadvantages of the dichroic type, especially to increase the total amount of light transmitted by the polarizing sheet, consists of a suspension of anisotropic crystals of particular shape and size in a transparent isotropic medium, e. g., a plastic film, having a refractive index exactly corresponding to, or matching, one of the principal refractive indices of the anisotropic crystals suspended in it, e. g., that for the ordinary ray. Ordinary light entering such a sheeting is resolved at each crystal interface into two components polarized in planes at right angles to each other. The component vibrating in the plane perpendicular to the needle axis is not affected by the crystal since the refractive index of crystal and suspending medium are the same. However, the polarized component in which the light is vibrating in the plane at right angles to the first, or parallel to the needle axis, passes from a medium of one refractive index to another of different refractive index, consequently reflection and refraction take place. Since the crystals are needle-like this results in the scattering of this polarized component largely in a 180° band. In the application of such a polarizing device to automobile headlights, an operator of an approaching car using a polarizing viewing screen would not see the directly transmitted beam which causes glare and the visible scattered light would not interfere with his ability to see the highway since it would be substantially reduced in intensity. Furthermore, the visible scattered light would indicate the approach of the oncoming car over the brow of a hill or around a bend; whereas the approaching cars would be almost invisible were the dichroic type of polarizing screen employed. However, this latter diffusing type of screen is difficult to make of good quality because crystals of suitable shape, size, refractive index difference, and solubility must be oriented in a plastic sheet of suitable refractive index. Crystals having the particular combination of properties just mentioned are very rare, hence this type of polarizing sheet is commercially impracticable.

It is an object of this invention to produce new and improved transparent polarizing sheets. A more specific object of this invention is the production of a new and improved polarizing sheet having improved efficiency in the production of a beam of plane polarized light. Other objects will be apparent from the detailed description hereinafter set forth.

The foregoing objects are accomplished in accordance with this invention which consists of a layer of transparent oriented polymeric material in the form of film or parallel fibers having a birefringence of at least 0.05 in optical contact with a transparent isotropic material which has a refractive index substantially identical with one of the refractive indexes of the oriented polymer, the birefringent polymer and the isotropic material forming separate phases in the polarizing sheet. In a preferred embodiment of this invention oriented fibers of a polymeric material having a birefringence of at least 0.05, e. g., polyethylene terephthalate, are embedded in a parallel manner in one or more layers in a transparent, isotropic material having a refractive index substantially identical with the lower refractive index of the fibers, and which is not a solvent for the birefringent fibers. Birefringence as used herein means the numerical difference between two refractive indices observed for a substance.

In another embodiment transparent, isotropic particles, e. g., powdered glass, are dispersed in a polymeric material which is capable of being oriented in film form sufficiently to develop a birefringence of at least 0.05. A film is then formed from the dispersion of isotropic particles in the polymeric material and the film is drawn or stretched to orient the polymer molecules, i. e., to arrange the polymer molecules in a parallel fashion, to develop the desired anisotropic characteristics. In this embodiment the refractive index of isotropic particles is selected to substantially coincide with the ordinary refractive index of the birefringent film.

In still another embodiment which consists essentially of a combination of the two preceding methods, isotropic transparent particles are dispersed in the birefringent polymeric material and the dispersion is then formed into fibers which are drawn to develop the necessary birefringence in them. These fibers are then embedded in a parallel manner in a transparent, isotropic medium having a refractive index identical with that of the isotropic particles dispersed in the fibers and also identical with the ordinary refractive index of the oriented fibers, i. e., identical with the refractive index for light vibrating in the plane of the cross section of the fibers. This particular embodiment provides a polarizing screen of greater scattering power, considerable light being scattered in all directions.

The invention is illustrated more or less diagrammatically in the accompanying drawing wherein:

Fig. I is an elevation of a polarizing sheet made according to one embodiment of the invention;

Fig. IA is a section on the line IA—IA in Fig. I;

Fig. II is a section through a polarizing sheet made according to a second embodiment of the invention; and Fig. IIA is a section on the line IIA—IIA in Fig. II.

Referring to Figs. I and IA, there is shown a polarizing sheet made of oriented fibers 1 of a transparent polymeric material having a birefringence of at least 0.05 embedded in a transparent isotropic material 2 which has a refractive index substantially identical with the refractive index for the ordinary ray of the birefringent fibers 1. The fibers 1 are arranged parallel to each other. If the isotropic material 2 is a liquid, the sheet may be formed between two parallel sheets of glass with the edges sealed to hold the liquid.

Referring to Figs. II and IIA, there is shown a polarizing sheet made up of a continuous oriented film 3 of a transparent polymeric material having a birefringence of at least 0.05, in which film are dispersed particles 4 of a transparent isotropic material having a refractive index substantially identical with the refractive index for the ordinary ray of the birefringent polymeric material.

The invention is illustrated in further detail by the following examples which are merely specific illustrations of the invention and are not to be construed as limitations of the same.

*Example I*

Fibers of polyethylene terephthalate in the form of 70 denier yarn having a tensile strength of 7.3 g./denier and having a birefringence of 0.199 are wound uniformly around a glass plate in a parallel manner until the yarn is several layers thick. The yarn is then cemented at the outside edges of the plate with a nitrocellulose cement to hold the fibers in place, and the fibers on one side removed. The fibers on the surface of the plate are then wet with a mixture of dimethyl phthalate and tricresyl phosphate, the proportions of each being adjusted to produce a mixture having a refractive index identical with the lower index of the polyethylene terephthalate fibers, namely, 1.5345. Another glass plate is then placed firmly over the polarizing element consisting of the birefringent fibers of polyethylene terephthalate immersed in the isotropic liquid mixture of the dimethyl phthalate and tricresyl phosphate, and the edges of the assembly sealed with adhesive tape. When this polarizing element is placed in front of a source of ordinary light and the transmitted light observed through a conventional polarizing screen it is noted that when the axis of the viewing screen is parallel to that of the polarizing screen the light is transmitted sharply, but when the axes of the polarizing and viewing screens are perpendicular the light intensity is reduced to a glow. The color of the light transmitted through the polarizing screen of this example is substantially unchanged, this indicates that the dispersion of light by the polyethylene terephthalate is low, or to be substantially the same as that of dimethyl phthalate and tricresyl phosphate mixture. When distant objects are viewed through the polarizer of this example alone they appear hazy. On the other hand, when such objects are viewed through the polarizer of this example and a conventional polarizing screen with the axes of the screens parallel to each other the distant object appears clear, but when the axes of the two screens are perpendicular to each other the distant objects are obliterated. When placed before an automobile headlight or flashlight, and viewed through a properly oriented polarizing screen the directed beam is obliterated, leaving only the diffuse beam of low enough intensity not to be blinding or glaring.

*Example II*

A polarizing screen of the same type as that of Example I is prepared in a similar manner by wrapping a single layer of polyethylene terephthalate monofilament of 0.3 mm. diameter around a glass plate. The single layer of anisotropic fibers is then embedded in a mixture of dimethyl phthalate and tricresyl phosphate having a refractive index of 1.5345 which is the same as the lower refractive index of the birefringent monofil. A glass plate is placed on top of the fibers and the isotropic medium and the edges sealed with adhesive tape. The resulting polarizing element has the same effect on ordinary light as the polarizer of Example I; however, the effect is not as marked since there is but a single layer of the birefringent fibers in the polarizing screen, which fibers act largely as a layer of cylindrical lenses for light polarized in one plane, but have no effect on light polarized in the other plane.

*Example III*

The process of Example I is repeated with the exception that the birefringent yarn employed in forming the polarizing element is the polyamide prepared from a mixture of equal parts of 1,2-di(p-aminophenyl)ethane-sebacic acid and hexamethylenediamine-sebacic acid. This polyamide yarn has a birefringence of 0.14. The resulting screen exhibits the same polarizing effect as that of Example I although the scattering effect is not as marked since the birefringence of this particular polyamide fiber is not as great as that of the polyethylene terephthalate fibers.

*Example IV*

A polarizing sheet composed of parallel fibers of a birefringent polymer embedded in an isotropic solid is prepared in the general manner of Example I. Drawn yarn of polypiperazine suberamide having a birefringence of 0.13 is wrapped in two layers around a glass plate. The fibers are covered with a layer of Canada balsam, which has a refractive index of 1.532, by heating the balsam until it is very fluid and bubble-free, and pressing a glass plate on the surface of the balsam covered fibers to produce a smooth surface and to remove excess balsam. The assembly is cooled to room temperature and after a few minutes the balsam sets to a solid. The resulting screen exhibits the same polarizing effect as that of Example III.

The foregoing examples have illustrated the practice of this invention by the use of transparent fibers of certain anisotropic polymers embedded in an isotropic liquid and in an isotropic solid. However, any anisotropic polymeric material capable of being drawn, rolled, etc., to cause the polymer molecules to become arranged, or oriented, in a parallel manner sufficiently to produce a birefringence of at least 0.05 and which is transparent in its oriented form can be used in this invention. In addition to the particular polymers mentioned in the examples many other polymers are capable of being oriented sufficiently to produce the necessary birefringence for use in this invention. Polyamides obtained by condensing in equimolecular amounts a dicarboxylic acid having at least four chain carbon atoms between the carboxylic groups and a 1,2-(p,p'-diaminodiaryl)ethane of the formula $H_2NArCH_2CH_2ArNH_2$, in which Ar in the preferred embodiment is a hydrocarbon radical of the group consisting of benzene, naphthalene, and diphenyl, in combination with other polyamide-forming reactants in proportions of at least 20% of the above-defined diamine, are especially suitable since they have a high birefringence. The preparation of polyamides of this type is disclosed in U. S. Patent application Serial No. 581,342, filed March 6, 1945, by R. S. Schreiber, now issued as U. S. Patent 2,451,695. Specific examples of polyamides which can be used are listed below together with their birefringence, i. e., the numerical difference between two refractive indices observed for the polyamides:

| Polyamides | Birefringence |
|---|---|
| Polyhexamethylene adipamide | 0.065 |
| 1,2-(p, p'-diaminodiphenyl) ethanesebacic acid/caprolactam (75/25) | 0.16–0.19 |
| 1,2-(p, p'-diaminodiphenyl) ethanesebacic acid/polyhexamethylene sebacamide/caprolactam (40/20/40) | 0.10 |

In addition to the isotropic substances of the examples, the medium in which the anisotropic fibers are embedded can be any other transparent isotropic substance which has a refractive index substantially coinciding with the refractive index of the birefringent fibers which it is desired to match, and which does not dissolve or otherwise adversely affect the fibers. When liquids or resinous materials are used an inert coating or covering, e. g., a glass plate, must be used to produce a practical polarizing screen; however, if an isotropic self-supporting, plastic medium is used a glass coating is not necessary. For practical purposes the embodiment in which the anisotropic fibers are suspended in an isotropic plastic medium is preferred. When an isotropic plastic medium is used its refractive index can be adjusted to match substantially the desired refractive index of the birefringent fibers by the addition of suitable plasticizers, softeners, or other convenient modifiers, or by blending with other plastic materials. Examples of other isotropic materials which can be employed in the practice of this invention include cellulose derivatives, e. g., cellulose acetate, and ethylcellulose, and synthetic resins, e. g., polyvinyl acetate, polystyrene, vinyl acetate-vinyl chloride copolymers, urea-formaldehyde resins and the like.

While it is preferable to match the refractive index of the isotropic medium to the refractive index for the ordinary ray, the refractive index for the extraordinary ray can be matched if desired. In this latter case, with light striking the polarizing screen perpendicularly, one of the polarized components would be transmitted directly, but with the incident light striking the screen at decreasing angles of incidence, the desired component of polarized light would be increasingly scattered.

As indicated previously, the anisotropic polymer can be used in film form as well as in fiber form. When the film form of the birefringent polymer is used the isotropic medium having a refractive index substantially coinciding with the refractive index for the ordinary ray of the film is dispersed throughout the film. Particles of glass are especially suitable for use as the isotropic medium in this embodiment since they are readily obtainable in the desired size, and with the desired refractive index. Instead of powdered glass, particles of any other transparent isotropic material which is not soluble in the anisotropic film can be used. Films and fibers of anisotropic polymers which are uniaxial are best, but those which are biaxial can be used provided two of the refractive indices are close together, i. e., within 0.01, and the third refractive index is more than 0.05 from the other two. Polyethylene terephthalate fibers are biaxial, but they operate essentially as uniaxial fibers in the practice of this invention.

In the embodiment of this invention involving the use of anisotropic fibers embedded in the isotropic medium the number of layers of anisotropic fibers can be varied over a wide range. A single layer of monofilaments produces a very appreciable amount of scattering of the component of light vibrating in the plane including the fiber axis. In general, greater scattering of the undesired component of the light is obtained with a larger number of layers of the anisotropic fibers.

In the embodiment of this invention in which isotropic particles are dispersed in an anisotropic film the concentration of the particles can also be varied widely. The maximum concentration of the particles is limited only by the amount which will permit suitable orientation of the polymer molecules in the film to produce the desired minimum birefringence. Concentrations of particles ranging from 0.1% up to 5% of the weight of the anisotropic polymer are suitable. Thin films, or thick films containing only a few isotropic particles give films of high transmission with the transmitted light rather uniformly divided between one directed polarized beam and a second scattered beam polarized at right angles to the other. Thick films or those more concentrated in isotropic particles result in the transmission of a lower amount of light polarized in a plane perpendicular to that of the directed beam. Some of this scattered component is lost by the scattering from particle to particle. Some is transmitted as scattered light polarized in the desired plane while some is scattered back to the source of the ordinary light, e. g., the headlamp reflector, where it is partially depolarized and retransmitted through the polarizing sheet. Hence, a polarizing sheet composed of isotropic particles embedded in an oriented, transparent anisotropic film with the concentration of isotropic particles and thickness of film adjusted properly gives a higher transmission of properly polarized light than possible with the dichroic type of polarizer of the prior art.

The polarizing sheets of this invention are useful in any application where a beam of plane polarized light accompanied by a scattered component polarized in a plane at 90° thereto can be used, and they are particularly useful in polarizing headlights for automobiles. They are also useful in desk lamps, where they reduce the amount of glare. The polarizing sheets of this invention have marked advantages over the hitherto known types of polarizing screens. They transmit a higher proportion of light than is possible with the dichroic types of polarizing screen, and they are more practical than the hitherto known scattering types of screen employing anisotropic crystals embedded in an isotropic medium, since suitable anisotropic crystals are extremely rare and are difficult to prepare in the proper size to produce efficient scattering of the light.

As many different embodiments of this invention may be made without departing from the scope and spirit thereof, it is to be understood that I do not intend any limitation except as contained in the appended claims.

I claim:

1. A light polarizing sheet of the type which resolves a beam of incident light into two components which emerge from the sheet as polarized beams with the planes of polarization substantially 90 degrees to each other, one of said beams emerging as a diffused beam, the other as a non-diffused beam, said sheet comprising a continuous body of a transparent isotropic material and fibers of a transparent polymeric material having the polymer molecules thereof oriented in parallelism to produce a birefringence of at least 0.05 embedded therein with said fibers substantially parallel to each other, said isotropic material having a refractive index substantially identical with the refractive index for the ordinary ray of said birefrigent polymeric material.

2. A light polarizing sheet as set forth in claim 1 wherein said polymeric material is polyethylene terephthalate.

3. A light polarizing sheet as set forth in claim 1 wherein said transparent isotropic material is a plastic material.

ORION EDWIN SCHUPP, Jr.

REFERENCES CITED

The following references are of record in the file of this patent:

UNITED STATES PATENTS

| Number | Name | Date |
| --- | --- | --- |
| 2,077,699 | Kline | Apr. 20, 1937 |
| 2,123,901 | Land | July 19, 1938 |
| 2,123,902 | Land | July 19, 1938 |
| 2,168,220 | Land | Aug. 1, 1939 |
| 2,264,190 | Sherts et al. | Nov. 25, 1941 |
| 2,270,323 | Land et al. | Jan. 20, 1942 |
| 2,285,792 | Bailey | June 9, 1942 |
| 2,287,556 | Land | June 23, 1942 |
| 2,447,790 | Barn et al. | Aug. 24, 1948 |
| 2,447,805 | Hyman | Aug. 24, 1948 |

Certificate of Correction

Patent No. 2,604,817

July 29, 1952

ORION EDWIN SCHUPP, Jr.

It is hereby certified that error appears in the printed specification of the above numbered patent requiring correction as follows:

Column 1, line 46, for "istotropic" read *isotropic*; column 3, line 52, after "made" insert *up*; column 6, line 16, for "convenient" read *conventional*; and that the said Letters Patent should be read as corrected above, so that the same may conform to the record of the case in the Patent Office.

Signed and sealed this 2nd day of December, A. D. 1952.

[SEAL]

THOMAS F. MURPHY,
*Assistant Commissioner of Patents.*